(12) United States Patent
Krause et al.

(10) Patent No.: US 9,103,376 B2
(45) Date of Patent: Aug. 11, 2015

(54) CHAMBERED SHAFT FOR IMPROVED BEARING LUBRICATION

(71) Applicant: Hamilton Sundstrand Corporation, Charlotte, NC (US)

(72) Inventors: Joseph Paul Krause, Downers Grove, IL (US); Jan Henry Abels, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/182,179

(22) Filed: Feb. 17, 2014

(65) Prior Publication Data

US 2015/0110429 A1 Apr. 23, 2015

Related U.S. Application Data

(60) Provisional application No. 61/894,693, filed on Oct. 23, 2013.

(51) Int. Cl.
| | |
|---|---|
| *F16C 33/66* | (2006.01) |
| *F16C 33/78* | (2006.01) |
| *F16C 3/02* | (2006.01) |
| *F16C 37/00* | (2006.01) |

(52) U.S. Cl.
CPC .............. *F16C 33/6677* (2013.01); *F16C 3/02* (2013.01); *F16C 33/6659* (2013.01); *F16C 33/7813* (2013.01); *F16C 37/007* (2013.01)

(58) Field of Classification Search
CPC ............. F16C 33/6659; F16C 33/6657; F16C 33/7816; F16C 33/7889; F16C 33/7896; F16C 17/08; F16C 37/002

USPC ......... 384/371, 462, 473–475, 478, 539, 543; 464/162, 183; 74/467; 415/96

See application file for complete search history.

(56) References Cited

U.S. PATENT DOCUMENTS

| 1,835,877 A | * | 12/1931 | Joyce ............................ 384/473 |
| 2,283,871 A | * | 5/1942 | Norelius ....................... 384/473 |
| 2,997,962 A | * | 8/1961 | Wysong, Jr. .................... 91/501 |

(Continued)

FOREIGN PATENT DOCUMENTS

| EP | 1406026 A1 | 4/2004 |
| EP | 2093439 A1 | 8/2009 |
| JP | 2004251308 A | 9/2004 |

OTHER PUBLICATIONS

The European Search report dated Mar. 4, 2015 for European Application No. 14189530.0.

*Primary Examiner* — Marcus Charles
(74) *Attorney, Agent, or Firm* — Kinney & Lange, P.A.

(57) ABSTRACT

A shaft for a bearing lubrication assembly includes an outer surface and a reservoir disposed within the shaft. A first seal groove is formed on the outer surface and extends a full circumference of the outer surface. A second seal groove is also formed on the outer surface and extends the full circumference of the outer surface. A radial port extends from the reservoir to the outer surface, the radial port intersecting the outer surface between the first seal groove and the second seal groove. A plurality of chambers are formed in the shaft and disposed axially between the first seal groove and the second seal groove. The plurality of chambers are open to the outer surface with each chamber having a closed bottom disposed radially inward from the outer surface. Each chamber is also circumferentially spaced from one another.

14 Claims, 2 Drawing Sheets

(56) References Cited

U.S. PATENT DOCUMENTS

| | | | |
|---|---|---|---|
| 3,500,961 A * | 3/1970 | Eberhardt et al. | 415/96 |
| 3,543,536 A * | 12/1970 | Rekow | 464/16 |
| 3,543,647 A * | 12/1970 | Gregerson et al. | 91/420 |
| 3,720,060 A * | 3/1973 | Davies et al. | 60/226.1 |
| 4,174,031 A * | 11/1979 | MacLeod | 384/419 |
| 4,308,729 A * | 1/1982 | Condon | 464/16 |
| 4,364,717 A * | 12/1982 | Schippers et al. | 417/407 |
| 5,561,975 A * | 10/1996 | Gambini | 60/338 |
| 5,888,008 A * | 3/1999 | Obersteller et al. | 401/230 |
| 6,113,355 A * | 9/2000 | Hult et al. | 417/214 |
| 6,474,444 B1 * | 11/2002 | Mochizuki | 384/462 |
| 7,793,499 B2 * | 9/2010 | Gutknecht | 60/605.3 |
| 8,579,512 B2 * | 11/2013 | Radinger et al. | 384/473 |
| 2008/0116622 A1 * | 5/2008 | Fox | 267/64.28 |
| 2008/0318694 A1 * | 12/2008 | Beattie | 464/183 |
| 2012/0085548 A1 * | 4/2012 | Fleckenstein et al. | 166/373 |
| 2013/0283758 A1 | 10/2013 | Wotzak | |

\* cited by examiner

CHAMBERED SHAFT FOR IMPROVED BEARING LUBRICATION

BACKGROUND

The present invention relates to bearing lubrication and more specifically to the lubrication of bearings at startup of a machine utilizing the bearings (machine startup).

Bearings in rotating machinery usually require some type of lubricant to ensure long life and proper function. Bearing lubrication is critical, especially in applications where the bearings experience high speeds, high loads, and/or high temperatures, such as in aircraft electrical power generators. In aircraft electrical power generators and similar applications, a pump delivers lubricating fluid supply from a lubrication reservoir to the bearings. During machine startup, lubricant delivery to the bearings may take some time as the pump pressurizes the lubricating fluid, resulting in the bearings rotating with insufficient lubrication for a period of time. Whenever the bearings rotate at machine startup without sufficient lubrication, the bearings experience a significant amount of wear. It is therefore critical to deliver lubrication to the bearings as soon as possible during machine startup so as to reduce bearing wear.

SUMMARY

In one aspect, a shaft for a bearing lubrication assembly includes an outer surface and a reservoir disposed within the shaft. A first seal groove is formed on the outer surface and extends a full circumference of the outer surface. A second seal groove is also formed on the outer surface and extends the full circumference of the outer surface. A radial port extends from the reservoir to the outer surface, the radial port intersecting the outer surface between the first seal groove and the second seal groove. A plurality of chambers are formed in the shaft and disposed axially between the first seal groove and the second seal groove. The plurality of chambers are open to the outer surface with each chamber having a closed bottom disposed radially inward from the outer surface. Each chamber is also circumferentially spaced from one another.

In another aspect, a bearing lubrication assembly includes a first shaft with an outer surface, a first seal groove formed on the outer surface and extending a full circumference of the outer surface, and a second seal groove formed on the outer surface and also extending the full circumference of the outer surface. A plurality of chambers are formed in the shaft and disposed axially between the first seal groove and the second seal groove. The plurality of chambers are open to the outer surface with each chamber having a closed bottom disposed radially inward from the outer surface. Each chamber is also circumferentially spaced from one another. The bearing lubrication assembly also includes a tubular second shaft disposed around the first shaft. The second shaft includes an outer surface, an inner surface, and a first radial port that extends from the inner surface to the outer surface of the second shaft. The first radial port is axially aligned with the plurality of chambers.

Persons of ordinary skill in the art will recognize that other aspects and embodiments of the present invention are possible in view of the entirety of the present disclosure, including the accompanying figures.

Figure 1:
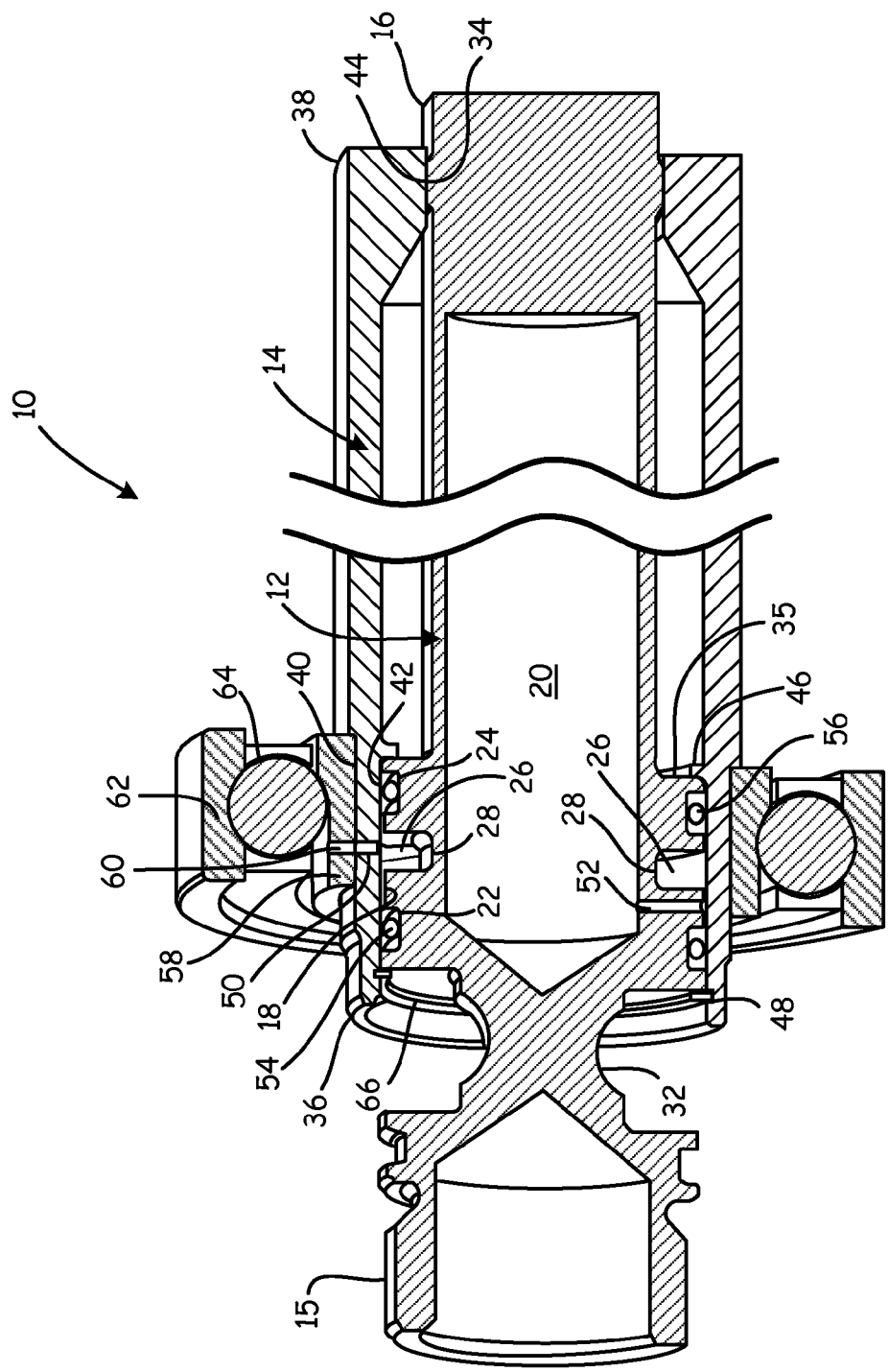
FIG. 1 is a cross-sectional view of an embodiment of a bearing lubrication assembly.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In at least some embodiments, the present invention relates generally to a bearing lubrication assembly that includes a first shaft disposed within a second shaft. The first shaft includes a plurality of chambers formed on its outer surface and disposed between two axially spaced seals. A bearing assembly is disposed around the second shaft. A reservoir delivers lubricating fluid between the first shaft and the second shaft. A radial port formed in the second shaft directs the lubricating fluid disposed between the two shafts into the bearing assembly. When the bearing lubrication assembly powers down, lubricating fluid is captured and stored in the plurality of chambers to be used during machine startup to lubricate the bearing assembly so that the bearing assembly does not have to rotate without lubrication while the lubrication assembly achieves steady-state. Persons of ordinary skill in the art will recognize additional features and benefits in view of the entirety of the present disclosure, including the accompanying figures.

Figure 2:
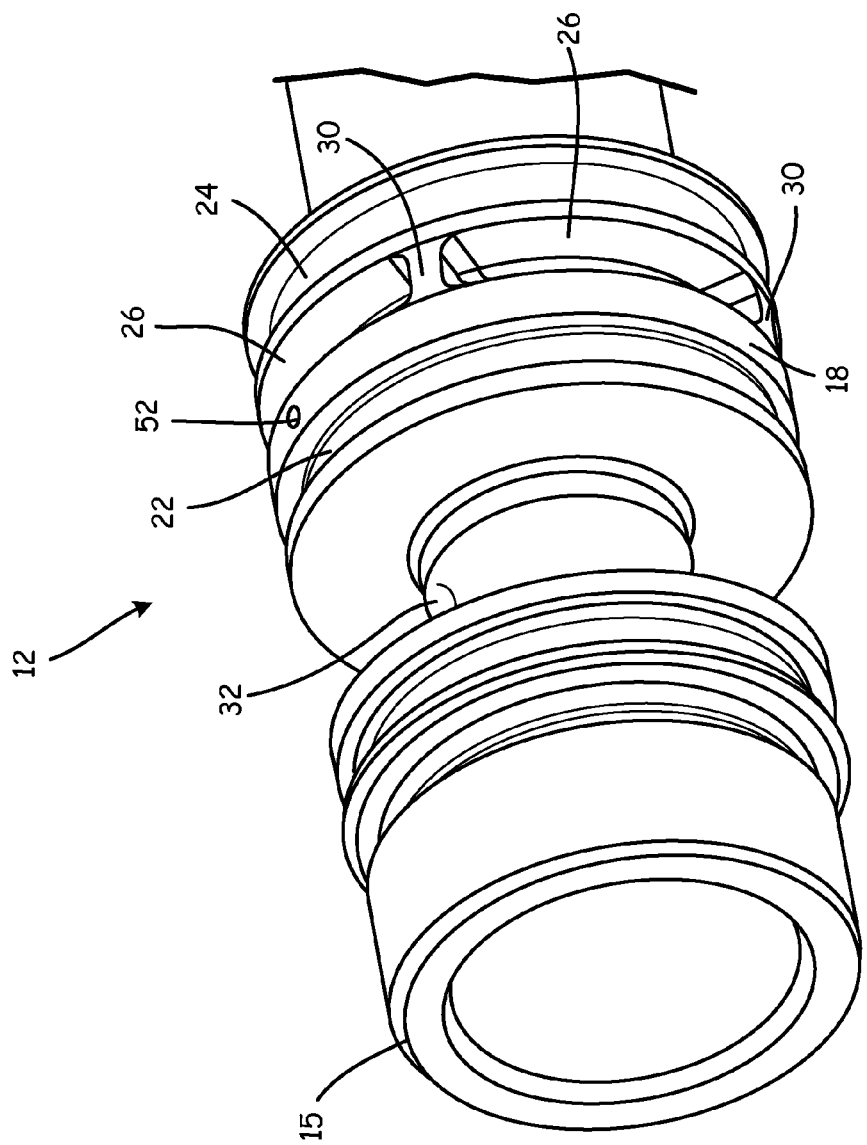
FIG. 2 is a perspective view of an embodiment of an inner shaft from the bearing lubrication assembly of FIG. 1.

FIGS. 1 and 2 will be discussed concurrently. FIG. 1 is a cross-sectional view of one embodiment of bearing lubrication assembly 10, and FIG. 2 is a perspective view of one embodiment of first shaft 12 from bearing lubrication assembly 10. A portion of bearing lubrication assembly 10 is omitted in FIG. 1 so as to fit FIG. 1 on a single page. As shown in FIG. 1, bearing lubrication assembly 10 includes first shaft 12 and second shaft 14. As shown in both FIGS. 1 and 2, first shaft 12 can include first end 15, second end 16, outer surface 18, reservoir 20, first seal groove 22, second seal groove 24, a plurality of chambers 26 with closed bottoms 28, axially extending walls 30 (only labeled in FIG. 2), shear section 32, spline member 34, and ledge 35. Second shaft 14 is tubular and can include first end 36, second end 38, outer surface 40, inner surface 42, spline member 44, stop 46, and locking groove 48. Second shaft 14 can also include radial port 50 and first shaft 12 can include radial port 52. Bearing lubrication assembly 10 can also include first seal 54, second seal 56, bearing inner race 58 with radial fluid inlet 60, bearing outer race 62, bearing element 64, and snap ring 66.

First shaft 12 extends axially between first end 15 and second end 16. Outer surface 18 of first shaft 12 is an outer circumferential surface that extends around an outer circumference of first shaft 12. First seal groove 22 is formed on outer surface 18 of first shaft 12 and extends a full circumference of outer surface 18 of first shaft 12. Second seal groove 24 is also formed on outer surface 18 of first shaft 12 and extends the full circumference of outer surface 18 of first shaft 12. Second seal groove 24 can be axially spaced from first seal groove 22 on outer surface 18 of first shaft 12 so as to accommodate chambers 26. Chambers 26 are formed on first shaft 12 and disposed axially between first seal groove 22 and second seal groove 24. Chambers 26 are open to outer surface 18 of first shaft 12 and each chamber 26 includes closed bottom 28 disposed radially inward from outer surface 18 of first shaft 12. As shown in FIG. 2, each chamber 26 can be circumferentially spaced from one another around first shaft 12. Axially extending walls 30 separate each chamber 26 from the rest of chambers 26. In preferred embodiments, there are at least three chambers 26, but the number of chambers 26 can vary as desired for particular applications. As discussed in detail below, because chambers 26 are radially open to outer surface 18, include closed bottoms 28, are separated from one another by axially extending walls 30, and are circumferentially spaced around first shaft 12, chambers 26 can hold fluid similar to a cup and at least some of chambers 26 on first shaft 12 will be oriented in an upward or semi-upward facing position capable of holding and storing some amount of lubricating fluid when first shaft 12 is stationary and not rotating.

Reservoir 20 can be disposed within first shaft 12 to provide a source of lubricating fluid. Reservoir 20 can be a cylindrical bore centered radially within first shaft 12. Reservoir 20 does not intersect chambers 26 and can be disposed radially within from chambers 26. As shown in FIG. 1, at least one radial port 52 can extend radially outward from reservoir 20 toward outer surface 18 of first shaft 12, and intersect outer surface 18 of first shaft 12 between first seal groove 22 and second seal groove 24. Radial port 52 extends from reservoir 20 to outer surface 18 of first shaft 12 without intersecting chambers 26 and can be positioned axially between first seal groove 22 and chambers 26. While FIGS. 1 and 2 only show one radial port 52, one skilled in the art will recognize that first shaft 12 can include more than one radial port 52. First seal 54 can be disposed at least partially in first seal groove 22, and second seal 56 can be disposed at least partially in second seal groove 24. First seal 54 and second seal 56 can both be O-rings. As discussed below, first seal 54 and second seal 56 provide a seal between first shaft 12 and second shaft 14 that helps prevent fluid leakage between first shaft 12 and second shaft 14 and undesirable foreign particle incursion into bearing lubrication assembly 10.

Second shaft 14 extends axially between first end 36 and second end 38. Second shaft is also tubular with inner surface 42 disposed radially within outer surface 40. Second shaft 14 is disposed around first shaft 12 such that inner surface 42 of second shaft 14 faces outer surface 18 of first shaft 12. Inner surface 42 of second shaft 14 can include a diameter that is larger than a diameter of outer surface 18 of first shaft 12, such that a gap exists between inner surface 42 of second shaft 14 and outer surface 18 of first shaft 12. First seal 54 and second seal 56 engage inner surface 42 of second shaft 14, thereby fluidically sealing the gap axially between first seal 54 and second seal 56. Radial port 50 can extend radially from inner surface 42 to outer surface 40 of second shaft 14. Radial port 50 can also be axially aligned with chambers 26. While FIG. 1 only shows one radial port 50, one skilled in the art will recognize that second shaft 14 can include more than one radial port 50. Both radial port 50 of second shaft 14 and radial port 52 of first shaft 12 are fluidically connected to the gap disposed radially between inner surface 42 and outer surface 18, and axially between first seal 54 and second seal 56.

Bearing inner race 58 can be disposed around second shaft 14. Radial fluid inlet 60 can extend across bearing inner race 58 and can also be aligned with radial port 50 of second shaft 14 such that radial fluid inlet 60 is capable of receiving lubricating fluid from radial port 50. While FIG. 1 only shows one radial fluid inlet 60, one skilled in the art will recognize that bearing inner race 58 can include more than one radial fluid inlet 60. Bearing outer race 62 can be disposed around bearing inner race 58. Bearing element 64 is disposed between bearing outer race 62 and bearing inner race 58.

During operation of bearing lubrication assembly 10, first shaft 12, second shaft 14, and inner race 58 rotate. The rotation of first shaft 12 and second shaft 14 generates a centrifugal force that urges lubricating fluid disposed in reservoir 20 into radial port 52 of first shaft 12. The lubricating fluid travels radially outward through radial port 52 and into the gap disposed between outer surface 18 of first shaft 12 and inner surface 42 of second shaft 14. First seal 54 and second seal 56 help prevent the lubricating fluid from leaking axially outside the gap between first seal 54 and second seal 56. Inside the gap between first shaft 12 and second shaft 14 and between first seal 54 and second seal 56, the centrifugal force urges the lubricating fluid against inner surface 42 of second shaft 14. The lubricating fluid is then urged into radial port 50 of second shaft 14 where it travels radially outward and into radial fluid inlet 60 of bearing inner race 58. The lubricating fluid then travels across radial fluid inlet 60 and exits radial fluid inlet 60 between bearing inner race 58 and bearing outer race 62 where it lubricates bearing element 64. Bearing lubrication assembly 10 can also include additional features for lubricating bearing element 64, such as jets that spray lubricating fluid directly onto bearing inner race 58, bearing outer race 62, and bearing element 64.

During machine shutdown, first shaft 12, second shaft 14, and bearing inner race 58 cease to rotate. As first shaft 12, second shaft 14, and inner race 58 cease to rotate, the centrifugal force that urges the lubrication fluid radially outward dissipates. Once the centrifugal force dissipates, gravitational forces can cause at least some of the lubricating fluid presently disposed on inner surface 42 of second shaft 14 and the lubricating fluid disposed inside radial port 50 of second shaft 14 to fall radially inward and onto first shaft 12. As lubricating fluid falls from second shaft 14 to first shaft 12, at least some of that lubricating fluid falls inside those of chambers 26 whose openings are positioned (gravitationally) upward or partially upward at the time first shaft 12, second shaft 14, and bearing inner race 58 stopped rotating. The lubricating fluid captured by chambers 26 is stored inside chambers 26 until machine startup when first shaft 12, second shaft 14, and bearing inner race 58 begin rotating again. The lubricating fluid not captured by chambers 26 can flow to the bottom (gravitationally) of the gap disposed radially between inner surface 42 and outer surface 18, and axially between first seal 54 and second seal 56, and await there until machine startup when first shaft 12, second shaft 14, and bearing inner race 58 begin rotating again.

At machine startup, when first shaft 12, second shaft 14, and bearing inner race 58 begin rotating again, the centrifugal force generated by the rotation of first shaft 12 and second shaft 14 forces the lubricating fluid stored inside chambers 26 to move radially outward onto inner surface 42 of second shaft 14 and into radial port 50 of second shaft 14. The lubricating fluid then flows into radial fluid inlet 60 and continues on to bearing element 64 and bearing outer race 62. The lubricating fluid that traveled from chambers 26 to bearing element 64 can lubricate bearing inner race 58, bearing outer race 62, and bearing element 64 before lubricating fluid disposed in reservoir 20 reaches bearing element 64, thereby reducing the duration of time that bearing element 64 rotates at machine startup without lubrication. Reducing the amount of time that bearing element 64 rotates without lubrication helps minimize the wear experienced between bearing inner race 58, bearing outer race 62, and bearing element 64 and thereby increases the operating life of bearing inner race 58, bearing outer race 62, and bearing element 64.

First shaft 12 and second shaft 14 can be rotationally fixed to one another such that first shaft 12 and second shaft 14 do not rotate relative to one another, thereby ensuring that they rotate at the same speed during machine operation. As shown in FIG. 1, radially outward extending spline 34 can be formed on first shaft 12 proximate second end 16 of first shaft 12. Radially inward extending spline 44 can be formed on second shaft 14 proximate second end 38 of second shaft 14. Radially outward extending spline 34 of first shaft 12 engages with radially inward extending spline 44 of second shaft 14. Together, radially outward extending spline 34 and radially inward extending spline 44 form a spline connection between first shaft 12 and second shaft 14 that rotationally fixes second shaft 14 to first shaft 12. Second shaft 14 can include additional features, such as stop 46 and locking groove 48, that aid in axially positioning first shaft 12 relative second shaft 14.

Stop 46 can extend radially inward from inner surface 42 of second shaft 14 between first end 36 and second end 38 of second shaft 14. Stop 46 engages first shaft 12 between second seal groove 24 and second end 16 of first shaft 12. First shaft 12 can include a reduced diameter region between second seal groove 24 and second end 16 that includes a diameter smaller than a diameter of outer surface 18 of first shaft 12 so as to create ledge 35 on first shaft 12. Ledge 35 on first shaft 12 can engage stop 46 of second shaft 14. Locking groove 48 can be formed in second shaft 14 and extend radially outward from inner surface 42 of second shaft 14. First seal groove 22 and second seal groove 24 of first shaft 12 are axially positioned between locking groove 48 and stop 46 of second shaft 14. Snap ring 66 can be disposed in locking groove 48 and extends radially inward to engage first shaft 12. Together, stop 46, ledge 35, locking groove 48, and snap ring 66 axially restrain first shaft 12 relative second shaft 14 and ensure that radial port 50 of second shaft 14 is properly positioned proximate chambers 26. First shaft 12 can also include shear section 32. Shear section 32 can be positioned on first shaft 12 between first end 15 of first shaft 12 and first seal groove 22. Shear section 32 acts as a fail-safe mechanism that allows first shaft 12 to shear at shear section 32 to protect components connected to first shaft 12 should first shaft 12 experience a predetermined level of shear stress. For example, first end 15 of first shaft 12 can be connected to a gear box of an auxiliary power unit (APU) for an aircraft, and second end 16 of first shaft 12 can be connected to a generator. Should the APU generate an undesirable level of shear stress in first shaft 12, first shaft 12 will shear at shear section 32 to protect the generator from experiencing too much stress.

Possible Benefits:

Persons of ordinary skill in the art will recognize that bearing lubrication assembly 10 of the present invention can provide numerous advantages and benefits. Some examples of those advantages and benefits are as follows. Chambers 26 store lubricating fluid in relatively close proximity to bearing element 64 at machine shutdown. At machine startup, chambers 26 deliver the stored lubricating fluid relatively quickly to bearing element 64 so that bearing element 64, bearing inner race 58, and bearing outer race 62 are lubricated quickly at startup and do not have to wait for lubrication to be delivered from reservoir 20. Providing lubricating fluid to bearing element 64, bearing inner race 58, and bearing outer race 62 quickly at startup can reduce the wear and increase the life of bearing element 64, bearing inner race 58, and bearing outer race 62. Furthermore, first seal 54 and second seal 56 reduce the likelihood of foreign contaminants entering the lubricating fluid and increasing the wear on bearing element 64, bearing inner race 58, and bearing outer race 62.

Discussion of Possible Embodiments

The following are non-exclusive descriptions of possible embodiments of the present invention.

In one embodiment, a shaft for a bearing lubrication assembly includes an outer surface and a reservoir disposed within the shaft. A first seal groove is formed on the outer surface and extends a full circumference of the outer surface. A second seal groove is also formed on the outer surface and extends the full circumference of the outer surface. A radial port extends from the reservoir to the outer surface, the radial port intersecting the outer surface between the first seal groove and the second seal groove. A plurality of chambers are formed in the shaft and disposed axially between the first seal groove and the second seal groove. The plurality of chambers are open to the outer surface with each chamber having a closed bottom disposed radially inward from the outer surface. Each chamber is also circumferentially spaced from one another.

The shaft of the preceding paragraph can optionally include, additionally and/or alternatively, any one or more of the following features, configurations and/or additional components:

the reservoir is a cylindrical bore centered within the shaft;

the radial port is positioned axially between the first seal groove and the plurality of chambers;

the plurality of chambers comprises at least three chambers;

each of the plurality of chambers are separated from one another by axially extending walls; and/or the shaft further includes a shear section and a spline, and wherein the first seal groove, the second seal groove, and the plurality of chambers are disposed on the shaft between the shear section and the spline.

In another embodiment, a bearing lubrication assembly includes a first shaft with an outer surface, a first seal groove formed on the outer surface and extending a full circumference of the outer surface, and a second seal groove formed on the outer surface and also extending the full circumference of the outer surface. A plurality of chambers are formed in the shaft and disposed axially between the first seal groove and the second seal groove. The plurality of chambers are open to the outer surface with each chamber having a closed bottom disposed radially inward from the outer surface. Each chamber is also circumferentially spaced from one another. The bearing lubrication assembly also includes a tubular second shaft disposed around the first shaft. The second shaft includes an outer surface, an inner surface, and a first radial port that extends from the inner surface to the outer surface of the second shaft. The first radial port is axially aligned with the plurality of chambers.

The assembly of the preceding paragraph can optionally include, additionally and/or alternatively, any one or more of the following steps, features, and/or configurations:

a first seal disposed at least partially in the first seal groove, and a second seal disposed at least partially in the second seal groove;

the first shaft and the second shaft are connect such that the first shaft and the second shaft are rotationally fixed relative one another;

a spline connection configured to engage the first and second shafts together;

a bearing inner race disposed around the second shaft and having a radial fluid inlet aligned with the first radial port;

a gap disposed between the outer surface of the first shaft and the inner surface of the second shaft;

a reservoir disposed within the shaft and a second radial port extending from the reservoir to the outer surface of the first shaft, the second radial port intersecting the outer surface of the first shaft between the first seal groove and the second seal groove;

a stop that extends radially inward from the inner surface of the second shaft and engages the first shaft;

a locking groove extending radially outward from the inner surface of the second shaft;

a snap ring disposed in the locking groove; and/or the first seal groove and the second seal groove of the first shaft are axially positioned between the locking groove and the stop.

Summation

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while the above description describes first shaft 12 and second shaft 14 being connected by a spline connection, first shaft 12 and second shaft 14 can alternately be connected by a threaded connection, a braze, lock pins, or any other means that rotationally fixes first shaft 12 and second shaft 14 together. Therefore, it is intended that the invention not be limited to the particular embodiment(s) disclosed, but that the invention will include all embodiments falling within the scope of the appended claims.

The invention claimed is:

1. A shaft for a bearing lubrication assembly, the shaft comprising:
an outer surface;
a reservoir disposed within the shaft;
a first seal groove formed on the outer surface and extending a full circumference of the outer surface;
a second seal groove formed on the outer surface and extending a full circumference of the outer surface;
a radial port extending from the reservoir to the outer surface, the radial port intersecting the outer surface between the first seal groove and the second seal groove; and
a plurality of chambers formed in the shaft and positioned axially on the shaft between the first seal groove and the second seal groove, the plurality of chambers being open to the outer surface, each chamber having a closed bottom disposed radially inward from the outer surface, and each chamber of the plurality of chambers being spaced apart from one another along the circumference of the outer surface of the shaft.

2. The shaft of claim 1, wherein the reservoir is a cylindrical bore centered within the shaft.

3. The shaft of claim 1, wherein the radial port is positioned axially between the first seal groove and the plurality of chambers.

4. The shaft of claim 1, wherein the plurality of chambers comprises at least three chambers.

5. The shaft of claim 1, wherein each of the plurality of chambers are separated from one another by axially extending walls.

6. The shaft of claim 1 further comprising
a shear section; and
a spline,
wherein the first seal groove, the second seal groove, and the plurality of chambers are disposed on the shaft between the shear section and the spline.

7. A bearing lubrication assembly comprising:
a first shaft comprising:
an outer surface;
a first seal groove formed on the outer surface and extending a full circumference of the outer surface;
a second seal groove formed on the outer surface and extending a full circumference of the outer surface;
a plurality of chambers formed in the shaft and positioned axially on the shaft between the first seal groove and the second seal groove, the plurality of chambers being open to the outer surface, each chamber having a closed bottom disposed radially inward from the outer surface, and each chamber of the plurality of chambers being spaced apart from one another along the circumference of the outer surface of the shaft; and
a tubular second shaft disposed around the first shaft, the second shaft comprising:
an outer surface;
an inner surface; and
a first radial port that extends from the inner surface to the outer surface of the second shaft, the first radial port being axially aligned with the plurality of chambers.

8. The bearing lubrication assembly of claim 7 further comprising:
a first seal disposed at least partially in the first seal groove; and
a second seal disposed at least partially in the second seal groove.

9. The bearing lubrication assembly of claim 7, wherein the first shaft and the second shaft are connect such that the first shaft and the second shaft are rotationally fixed relative one another.

10. The bearing lubrication assembly of claim 9 further comprising:
a spline connection configured to engage the first and second shafts together.

11. The bearing lubrication assembly of claim 7 further comprising:
a bearing inner race disposed around the second shaft, the bearing inner race comprising:
a radial fluid inlet aligned with the first radial port;
a gap disposed between the outer surface of the first shaft and the inner surface of the second shaft; and
the first shaft further comprising:
a reservoir disposed within the shaft; and a second radial port extending from the reservoir to the outer surface of the first shaft, the second radial port intersecting the outer surface of the first shaft between the first seal groove and the second seal groove.

12. The bearing lubrication assembly of claim 7, wherein the second shaft further comprises:
a stop that extends radially inward from the inner surface of the second shaft and engages the first shaft; and
a locking groove extending radially outward from the inner surface of the second shaft.

13. The bearing lubrication assembly of claim 12, wherein a snap ring is disposed in the locking groove.

14. The bearing lubrication assembly of claim 12, wherein the first seal groove and the second seal groove of the first shaft are axially positioned between the locking groove and the stop.

* * * * *